Jan. 23, 1940.                    H. MESINGER                    2,188,153
                         RESILIENT SUPPORT FOR SADDLES
                               Filed June 1, 1936
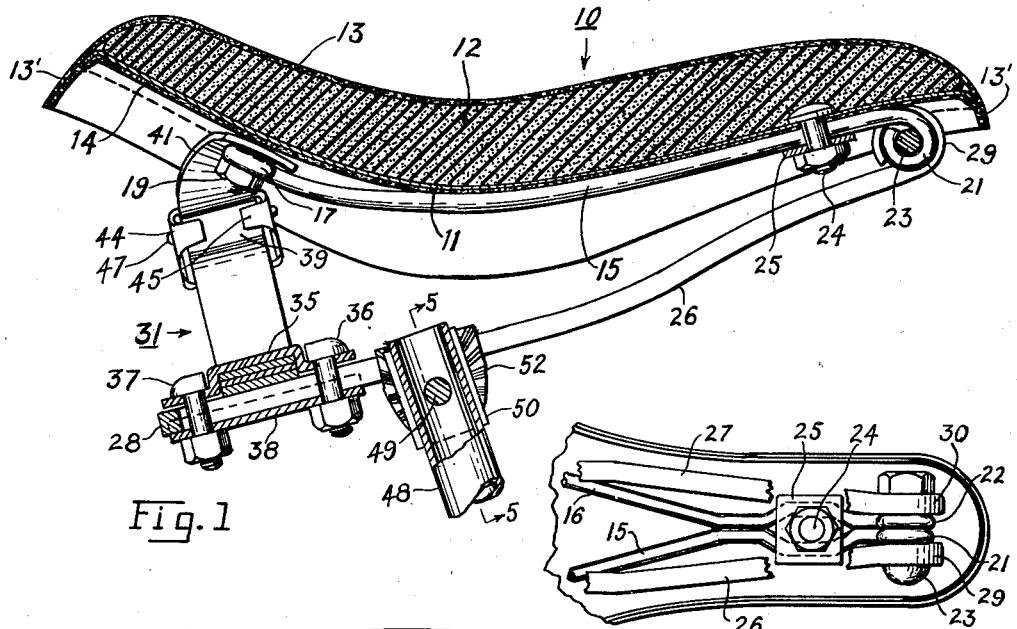
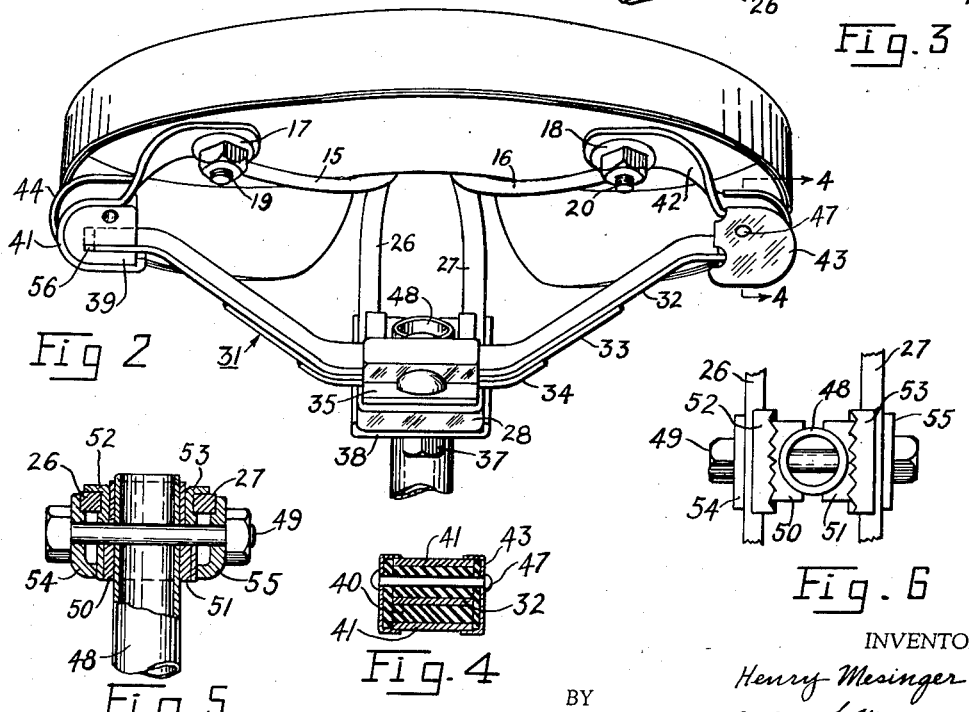
INVENTOR.
Henry Mesinger
William F. Mesinger
ATTORNEY.

Patented Jan. 23, 1940

2,188,153

UNITED STATES PATENT OFFICE 2,188,153

RESILIENT SUPPORT FOR SADDLES

Henry Mesinger, Mount Vernon, N. Y.

Application June 1, 1936, Serial No. 82,689

3 Claims. (Cl. 155—5.20)

This invention relates to resilient supports for saddles and more particularly to spring arrangements for resiliently supporting bicycle saddle seats.

The invention has for its principal object to provide an improved arrangement for supporting a saddle in yielding relation to a bicycle frame for insulating the rider from shocks caused by the travel of the vehicle over irregularities of the road surface.

More particularly it is an object to provide a seat supporting structure for saddles of the above character wherein the several parts are of relatively simple construction, wherein the use of a depending coil spring is not required and wherein the seat pillar and means of adjustment of the saddle in relation to the pillar is much simplified.

Other objects of the invention will in part be obvious and will in part appear hereinafter.

The invention accordingly comprises an article of manufacture possessing the features, properties, and the relation of elements which will be exemplified in the article hereinafter described and the scope of the application of which will be indicated in the claims.

For a fuller understanding of the nature and objects of the invention reference should be had to the following detailed description taken in connection with the accompanying drawing, in which:

Fig. 1 is a longitudinal sectional view of a saddle having an exemplary spring structure according to the invention;

Fig. 2 is a rear view of the structure shown in Fig. 1;

Fig. 3 is a fragmentary bottom view of the pommel portion of the saddle showing the forward hinge arrangement;

Fig. 4 is a view of a section taken on the line 4—4 of Fig. 2;

Fig. 5 is a fragmentary view of a transverse section axially through the seat pillar and clamp on the line 5—5 of Fig. 1; and Fig. 6 is a fragmentary plan view of the seat pillar and clamp.

Referring now to the drawing and particularly to Fig. 1, the saddle has a padded seat portion of the customary variety shown generally at 10. The seat 10 comprises a rigid pressed metal suitably shaped base 11 having downwardly turned edges. Upon the upper surface of base 11 is provided a layer of resilient material 12 such for example as sponge rubber which is covered by a preformed sheet of leather 13 having downwardly extending edge portions 13'. Attached to the underside of the base 11 a sheet leather bottom cover 14 is provided whose edges are affixed to the edge portions 13' by stitching.

To strengthen the base 11 steel reinforcing rods 15 and 16 are attached to the bottom of the seat. The rear portions of rods 15 and 16 are formed to have loop portions 17 and 18 around two bolts 19 and 20 whose heads are affixed to the base 11 at the rear portion of the saddle the bolts being spaced relatively widely apart. The reinforcing rods have portions extending forwardly from the loops 17 and 18 to a position centrally under the extreme forward or pommel portion of the saddle where the rods are provided with parallel loop portions 21 and 22 projecting outwardly and adapted to encircle a horizontally disposed hinge pin or bolt 23 whose axis is perpendicular to the longitudinal axis of the saddle. The forward portions of the rods 15 and 16 are affixed to the base by a bolt 24 which has its head attached to the base and passes thru a widened portion between the rods at a point near the loops 21 and 22. A washer 25 clamps the rods together against the bottom of the saddle. The washer 25 may preferably be provided with projections struck up from its lateral edges to prevent the rods 15 and 16 from spreading.

A supporting frame is provided for attachment to the seat pillar and for carrying the spring arrangement. The frame is preferably formed in one piece of square rod so as to have two longitudinal reach members 26 and 27 which are joined at their rear ends by a short horizontal portion 28 and have loops 29 and 30 formed at their forward ends for encircling the hinge pin 23. The loops 29 and 30 are disposed on either side of the loops 21 and 22 so as to provide a hinged joint therewith.

Upon the rear portions of the members 26 and 27 is supported a semi elliptical leaf spring shown generally at 31. The spring comprises a main spring metal leaf 32 and co-operating short leaves 33 and 34 disposed below the main leaf. The spring 31 is clamped at its mid portion to the members 26 and 27 by a clamping plate 35 passing across the upper surface of the spring and pressed thereon by bolts 36 and 37 passing through portions extending over both sides of the spring. A co-operating plate 38 is disposed under the members 26 and 27 through which the bolts 36 and 37 also pass and press upward. The plate 38 is provided with upturned edges one of which is indicated by the dotted outline in Fig. 1, engaging with the outward sides of the members 26 and 27 to prevent displacement of the parts.

The ends of the main leaf 32 are embedded in blocks of soft rubber 39 and 40 which are supported by brackets 41 and 42 from the base of the saddle. The brackets 41 and 42 are preferably formed of resilient strip metal and have portions holding the blocks 39 and 40 on three sides and other portions formed to extend upward and inwardly in contact with the base of the saddle to which they are fastened by the bolts 19 and 20 that are arranged to pass through holes provided near the ends of the brackets 41 and 42. To retain the blocks 39 and 40 in the desired position in the brackets there are provided end plates or caps 43 and 44 disposed on each side of the blocks which plates have edge flanges turned up to engage the outer surfaces of the brackets 41 and 42 and inside flanges 45 engaging the inner surfaces of the blocks. The plates are retained by rivets 47 which pass through each pair and the respective rubber blocks 39 and 40 as more clearly shown in Fig. 4. In Fig. 2 the plate 44 has been removed from the rear side of bracket 41 to clearly show the block 39 and the spring leaf 32 passing into it.

The seat pillar 48 which is supported by the bicycle frame in a vertically adjustable manner comprises a straight section of tube having a clamp bolt 49 passing through its upper portion and through the clamp structure. The clamp structure comprises a pair of blocks 50 and 51 disposed on each side of the pillar 48. The inner surfaces of the blocks 50 and 51 have a cylindrical shape to engage the tubular pillar while the outer surfaces have radial corrugations or teeth. Engaging with the teeth on blocks 50 and 51 are corresponding teeth on the inner faces of inner clamp plates 52 and 53 which are provided with outwardly extending flanges at their upper edges for engaging the top faces of reach members 26 and 27 respectively. Outer clamp plates 54 and 55 are provided engaging the outer sides of the members 26 and 27 to grip them tightly when the bolt 49, which passes through all the clamp parts, is tightened. The plates 54 and 55 are provided with inwardly turned lower edges to bear upon inner plates 52 and 53 and maintain the clamp plates substantially parallel.

The inner and outer clamp plates are so shaped at their upper portions so as to tightly grip the reach members 26 and 27 in a manner that permits the saddle to be adjusted forward or rearwardly relative to the pillar 48. The clamp plates may be angularly adjusted relative to the blocks 50 and 51 through arcs equivalent to one or more of the intermeshing teeth so that the saddle may be adjusted to the desired longitudinal angle.

Upon depression of the saddle seat by a rider the spring 31 will tend to be flattened out so that its ends will separate further apart. Such endwise movement is accommodated by providing a small clearance space 56 between the end of the leaf 32 and the end of the slot in the block 39 which accommodates it. Another portion of the movement is absorbed by the resilient deformability of the rubber blocks 39 and 40 and by the resiliency of the brackets 41 and 42. The rubber blocks provide in effect a cushion shackle joint that needs no lubrication and does not rattle. To avoid the use of retaining caps 43 and 44, the rubber blocks may be vulcanized in a permanent manner to the metal parts. If desired however other shackle joints having the desired action may be used or the spring may be made in the form of a three quarter elliptic spring without shackle joints. The reach members 26 and 27 are preferably resilient so as to provide a certain degree of resiliency for the front or pommel end of the saddle. It is also contemplated that the members 26 and 27 may be provided with a relatively large forward loop portions in addition to the loops 29 and 30 to provide additional resiliency and further, that when so provided with large forward loops, the hinge joint with loops 21, 22, 29, and 30 may be eliminated and the rods 15 and 16 form one piece with the members 26 and 27. It will be obvious too that a more customary arrangement for attaching the saddle frame members 26 and 27 to the seat pillar 48 may be used and as for example the pillar may be provided with a horizontally forward projecting cylindrical portion and the frame members clamped thereto in a customary manner.

Since certain changes may be made in the present saddle construction and different embodiments of the invention could be made without departing from the scope thereof, it is intended that all matter contained in the above description or shown in the accompanying drawing shall be interpreted as illustrative and not in a limiting sense.

Having described my invention, what I claim as new and desire to secure by Letters Patent, is:

1. In a bicycle saddle supporting structure the combination comprising a seat, a longitudinally disposed frame hingedly connected to the front portion of said seat, resilient members secured to the rear portion of said frame and extending laterally thereof, and resilient brackets secured to the under side of the rear portion of said seat and yieldably connected to the outer end portions of said resilient members.

2. A bicycle saddle comprising a seat, a longitudinally disposed frame yieldably connected to the forward portion of said seat, resilient members secured to the rear portion of said frame and extending laterally thereof, said members having outer end portions spaced a substantial distance below said seat, a pair of resilient brackets secured to the underside of the rear portion of said seat and extending laterally outward, and resilient means connecting each of said brackets to a respective end portion of said members, said resilient means being constructed and arranged to provide additional vertical resilience while resisting sidesway.

3. In a bicycle saddle supporting structure the combination comprising a seat, a longitudinally disposed frame having a rear portion and a forward portion yieldingly connected to the front portion of said seat, resilient members secured to said rear portion of said frame and extending laterally thereof, and brackets having a portion rigidly secured to the underside of the rear portion of said seat and each having a resilient portion respectively disposed above an outer end of one of said resilient members yieldably but positively connected to said respective outer end portions of said resilient members.

HENRY MESINGER.